United States Patent
Shigeeda et al.

(10) Patent No.: US 8,842,531 B2
(45) Date of Patent: Sep. 23, 2014

(54) IP ADDRESS DELIVERY SYSTEM AND IP ADDRESS DELIVERY METHOD

(75) Inventors: Tetsuya Shigeeda, Chiyoda-ku (JP); Hideharu Inoue, Chiyoda-ku (JP); Hiroyuki Ohata, Chiyoda-ku (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 0 days.

(21) Appl. No.: 13/516,957

(22) PCT Filed: Dec. 18, 2009

(86) PCT No.: PCT/JP2009/071185
§ 371 (c)(1),
(2), (4) Date: Jun. 18, 2012

(87) PCT Pub. No.: WO2011/074123
PCT Pub. Date: Jun. 23, 2011

(65) Prior Publication Data
US 2012/0263179 A1    Oct. 18, 2012

(51) Int. Cl.
*H04L 12/56* (2006.01)
*H04L 29/12* (2006.01)
*H04L 12/701* (2013.01)

(52) U.S. Cl.
CPC .......... *H04L 45/00* (2013.01); *H04L 29/12311* (2013.01); *H04L 61/2084* (2013.01)
USPC ....................................... 370/230

(58) Field of Classification Search
CPC ................. H04L 29/12311; H04L 29/12216; H04L 61/2084
USPC .................. 370/230, 389, 431, 464; 709/225
See application file for complete search history.

(56) References Cited

U.S. PATENT DOCUMENTS

| | | | |
|---|---|---|---|
| 5,465,330 A | 11/1995 | Komatsu et al. | |
| 2003/0219010 A1* | 11/2003 | Peng | 370/352 |
| 2006/0031488 A1* | 2/2006 | Swales | 709/224 |
| 2008/0295138 A1* | 11/2008 | Emoto et al. | 725/81 |

FOREIGN PATENT DOCUMENTS

| CN | 101061719 A | 10/2007 |
|---|---|---|
| JP | 04-046431 A | 2/1992 |

(Continued)

OTHER PUBLICATIONS

International Search Report dated Jan. 26, 2010, issued in corresponding international Application No. PCT/JP2009/071185. (2 pages).

(Continued)

*Primary Examiner* — Paul H Masur
(74) *Attorney, Agent, or Firm* — Buchanan Ingersoll & Rooney PC (57) ABSTRACT

An IP address delivery system includes an IP address delivery apparatus and a path-information granting unit. The IP address delivery apparatus includes: a path-information reading unit configured to read, from an IP address request signal transmitted from a request source of an IP address, path information of the request source; an IP address correspondence table in which a correspondence relation between the path information and the IP address is registered; and an IP-address determining unit configured to determine, based on the path information and the IP address correspondence table, an IP address delivered to the request source. The path-information granting unit is provided on a communication path between the IP address delivery apparatus and the request source and configured to grant the path information to the IP address request signal transmitted from the request source.

11 Claims, 7 Drawing Sheets

(56) References Cited

FOREIGN PATENT DOCUMENTS

| JP | 2004-503150 | A | 1/2004 |
| JP | 2005-260828 | A | 9/2005 |
| WO | 02/05107 | A1 | 1/2002 |

OTHER PUBLICATIONS

Comer, "Internetworking with TCP/IP vol. 1, Principles, Protocols and Architectures, Fourth Edition" (Kyoritsu Shuppan Co., Ltd.) (2002), 4 pages).

Chapter 19, "Private Network interconnection (NAT, VPN)" pp. 349-361.(Section 19.6 corresponds to Section 20.6 of COMER).

Mar. 31, 2014 Korean Office Action issued in Korean Patent Application No. 10-2012-7017767.

Office Action issued on Apr. 24, 2014, by the Chinese Patent Office in corresponding Chinese Patent Application No. 200980163035.4, and an English Translation of the Office Action. (16 pages).

\* cited by examiner

| PORT NUMBER | IP ADDRESS |
|---|---|
| 1 | 192.168.1.1 |
| 2 | 192.168.1.2 |
| 3 | 192.168.1.3 |
| 4 | 192.168.1.4 |

(CORRESPONDENCE TABLE)

| OTHERS | 192.168.1.5 TO 192.168.1.250 |
|---|---|

| TRANSMISSION DESTINATION INFORMATION |
|---|
| TRANSMISSION SOURCE INFORMATION |
| INFORMATION TYPE INFORMATION |
| ⋮ |
| FIRST PATH INFORMATION |
| SECOND PATH INFORMATION |
| ⋮ |

FIG.7

| FIRST PATH INFORMATION | SECOND PATH INFORMATION | IP ADDRESS |
|---|---|---|
| 1 | 1 | 192.168.1.11 |
| 2 | 1 | 192.168.1.21 |
| 3 | 1 | 192.168.1.31 |
| 4 | 1 | 192.168.1.41 |
| 1 | 2 | 192.168.1.12 |
| 2 | 2 | 192.168.1.22 |
| 3 | 2 | 192.168.1.32 |
| 4 | 2 | 192.168.1.34 |
| 3 | NONE | 192.168.1.30 |
| 4 | NONE | 192.168.1.40 |

CORRESPONDENCE TABLE

| OTHERS | 192.168.1.50 TO 192.168.1.240 |
|---|---|

IP ADDRESS DELIVERY SYSTEM AND IP ADDRESS DELIVERY METHOD

FIELD

The present invention relates to an IP address delivery system and an IP address delivery method.

BACKGROUND

TCP/IP is well known as a communication protocol on an Ethernet (registered trademark). In the TCP/IP, an IP address is used as information for identifying a terminal apparatus on the Ethernet (registered trademark). The IP address is uniquely allocated to each terminal apparatus.

As a method of determining IP addresses of terminal apparatuses on a network, there is a method of granting IP addresses to the terminal apparatuses not to overlap one another, recording the IP addresses in recording devices in the terminal apparatuses, and reading out the recorded IP addresses when the terminal apparatuses are started.

As a method of determining an IP address of an own terminal apparatus, there is a method of using a reverse address resolution protocol (RARP). The RARP is a protocol for inquiring about an IP address corresponding to a MAC address (a physical address of the Ethernet (registered trademark)) of the own terminal apparatus. In the RARP, when the MAC address of the own terminal apparatus is broadcasted, an IP address is returned by an RARP server on a network.

As an IP address delivery method different from the RARP, BOOTP (BOOTstrap Protocol), DHCP (Dynamic Host Configuration Protocol), or the like is sometimes used (Non Patent Literature 1).

CITATION LIST

Non Patent Literature

Non Patent Literature 1: *Internetworking with TCP/IP Vol. 1, Principles, Protocols and Architectures*, Fourth Edition Edited by Douglas E. Corner (Kyoritsu Shuppan Co., Ltd.)

SUMMARY

Technical Problem

A network in which an apparatus configuration is designed in advance is considered. Specifically, a network in which the arrangement of apparatuses included in the network is fixed and a physical pathway is also fixed is considered. In the network operated in a fixed manner in this way, it is convenient to also fix IP addresses granted to terminal apparatuses. Further, when a terminal apparatus is replaced because of a failure or the like, it is desirable, in terms of operation, to grant an IP address same as that before the replacement to the terminal apparatus after the replacement. Such granting of the IP address can be manually performed during the replacement of the terminal apparatus. However, if the IP address same as that before the replacement is automatically granted to the terminal apparatus after the replacement without the intervention of human operation, the convenience in operation is remarkably improved. However, In the related art, the IP address same as that before the replacement cannot be automatically delivered during the replacement of the terminal apparatus.

The present invention has been devised in view of the above and it is an object of the present invention to provide an IP address delivery apparatus and an IP address delivery method that can automatically deliver, during replacement of a terminal apparatus on a communication network, an IP address same as that before the replacement.

Solution to Problem

In order to solve the aforementioned problems, an IP address delivery system according to one aspect of the present invention includes: an IP address delivery apparatus including a path-information reading unit configured to read, from an IP address request signal, path information of a communication network extending to a request source of an IP address, an IP address correspondence table in which a correspondence relation between the path information and the IP address is registered, and an IP-address determining unit configured to determine, based on the path information obtained from the path-information reading unit and the IP address correspondence table, an IP address delivered to the request source; and a path-information granting unit configured to grant the path information to the IP address request signal.

Further, an IP address delivery method according to another aspect of the present invention includes: a path-information granting unit granting, to an IP address request signal, path information of a communication network extending to a request source of an IP address; a path-information reading unit of an IP address delivery apparatus reading the path information from the IP address request signal; an IP-address determining unit of the IP address delivery apparatus determining, by referring to an IP address correspondence table in which a correspondence relation between the path information and the IP address is registered, an IP address corresponding to the read path information; and the IP-address determining unit delivering the determined IP address to the request source.

Advantageous Effects of Invention

According to the present invention, there is an effect that it is possible to automatically deliver, during replacement of a terminal apparatus on a communication network, an IP address same as that before the replacement.

DESCRIPTION OF EMBODIMENTS

Embodiments of an IP address delivery system and an IP address delivery method according to the present invention are explained in detail below based on the drawings. The present invention is not limited by the embodiments.

First Embodiment

Figure 1:
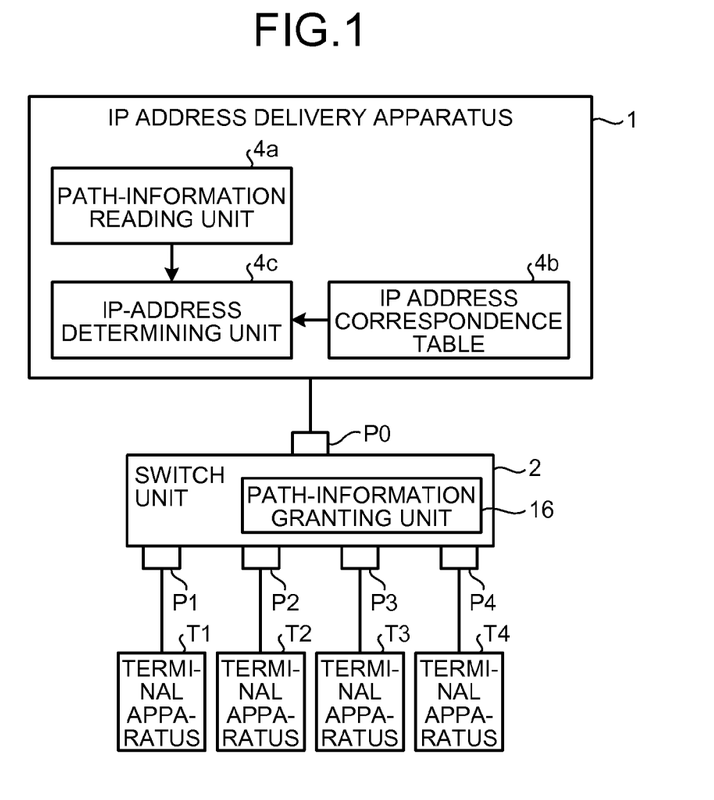
FIG. 1 is a block diagram of a schematic configuration of an IP address delivery system according to a first embodiment.

FIG. 1 is a block diagram of a schematic configuration of an IP address delivery system according to a first embodiment. As shown in FIG. 1, the IP address delivery system according to this embodiment includes an IP address delivery apparatus 1, a switch unit 2 connected to the IP address delivery apparatus 1, and, for example, four terminal apparatuses T1 to T4 connected to the switch unit 2.

The IP address delivery apparatus 1 is connected to a port P0 of the switch unit 2. The terminal apparatuses T1 to T4 are respectively connected to ports P1 to P4 of the switch unit 2. A pathway of a communication network in this embodiment is constructed to include such a switch unit 2. As the communication network, for example, an Ethernet (registered trademark) that adopts TCP/IP as a communication protocol can be used.

The switch unit 2 can operate as a switching hub on a network and discriminate in which of the ports P0 to P4 a signal passing through the switch unit 2 is received. Further, the switch unit 2 includes a path-information granting unit 16. The path-information granting unit 16 grants path information to an IP address request signal transmitted from a request source of an IP address. For example, when the Ethernet (registered trademark) is used, the switch unit 2 is obtained by adding the path-information granting unit 16 to an Ethernet (registered trademark) switch. As explained later on, the path information granted by the path-information granting unit 16 can be, for example, a port number of a port where the IP address request signal is received.

The IP address delivery apparatus 1 includes a path-information reading unit 4a, an IP address correspondence table 4b, and an IP-address determining unit 4c. The path-information reading unit 4a reads, from the IP address request signal, the path information of the communication network extending to the request source of the IP address. The IP address correspondence table 4b registers a correspondence relation between the path information and the IP address. The IP-address determining unit 4c determines, based on the path information obtained from the path-information reading unit 4a and the IP address correspondence table 4b, an IP address that should be delivered to the request source. In FIG. 1, the request source of the IP address is any one of the terminal apparatuses T1 to T4 that has transmitted the IP address request signal.

Figure 2:
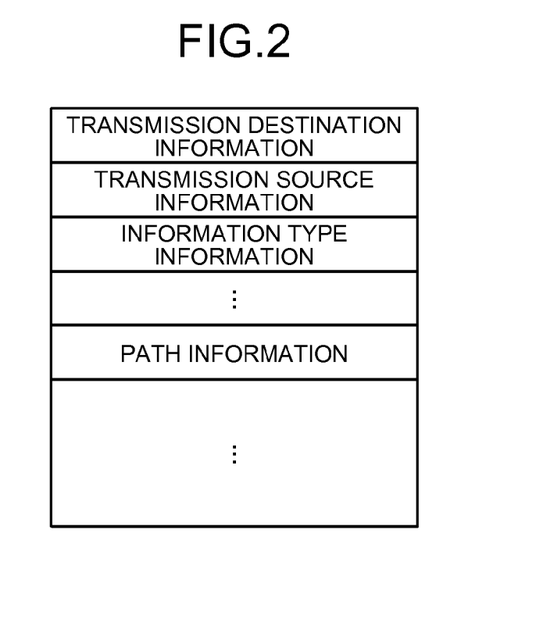
FIG. 2 is a diagram of an example of the structure of an IP address request signal used in IP network communication in the first embodiment.

FIG. 2 is a diagram of an example of the structure of an IP address request signal used in IP network communication in this embodiment. As shown in FIG. 2, the IP address request signal includes areas where transmission destination information, transmission source information, information type information, path information, and the like are stored and also a reserve area. The transmission source information is information peculiar to the terminal apparatuses T1 to T4 that generated the IP address request signal and is information used for individually specifying the terminal apparatuses T1 to T4. As such information, for example, MAC addresses allocated to the terminal apparatuses T1 to T4 can be used. In the IP address request signal, broadcast is designated as the transmission destination information and information indicating the IP address request signal is used as the information type information.

When the switch unit 2 receives the IP address request signal, the switch unit 2 stores, in the path information storage area of the IP address request signal, information (e.g., a port number) of a port where the IP address request signal is received. Specifically, for example, the switch unit 2 stores a port number "1" in the path information storage area when the switch unit 2 receives the IP address request signal in the port P1. The switch unit 2 stores a port number "2" in the path information storage area when the switch unit 2 receives the IP address request signal in the port P2. The switch unit 2 stores a port number "3" in the path information storage area when the switch unit 2 receives the IP address request signal in the port P3. The switch unit 2 stores a port number "4" in the path information storage area when the switch unit 2 receives the IP address request signal in the port P4. The switch unit 2 stores a port number "5" when the switch unit 2 receives the IP address request signal in a port P5. After granting the reception port information to the IP address request signal in this way, the switch unit 2 sends the IP address request signal from all the ports except the reception port.

Figure 3:
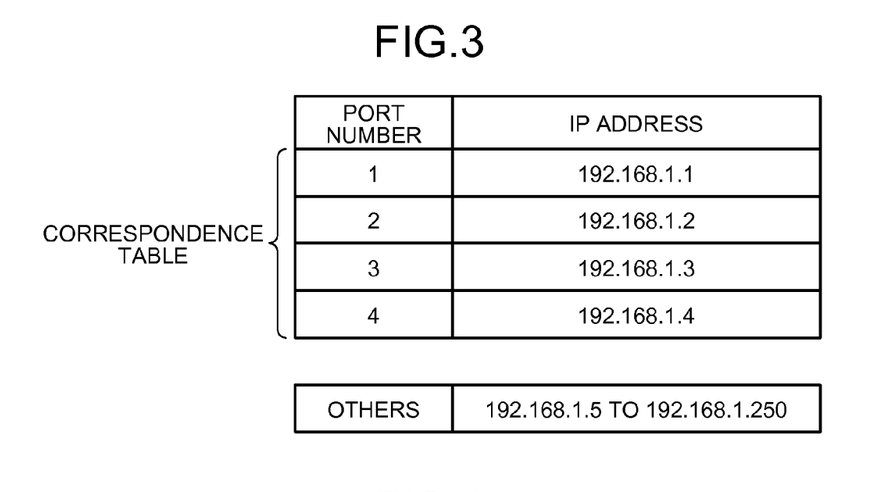
FIG. 3 is a diagram of an example of contents of an IP address correspondence table in the first embodiment.

FIG. 3 is a diagram of an example of contents of the IP address correspondence table 4b in this embodiment. In FIG. 3, IP addresses different from one another are registered in the IP address correspondence table 4b to respectively correspond to the port numbers "1" to "4". As it is evident from FIG. 1, paths extending from the terminal apparatuses T1 to T4 to the IP address delivery apparatus 1 can be uniquely designated by the port numbers P1 to P4 of the switch unit 2. When the IP address delivery apparatus 1 receives an IP address request signal, the IP address delivery apparatus 1 reads, with the path-information reading unit 4a, a path information storage area of the IP address request signal. When "1", "2", "3", or "4" is stored in the path information storage area, the IP address delivery apparatus 1 delivers an IP address corresponding to the number. Specifically, the IP address delivery apparatus 1 can allocate, in response to a request from the terminal apparatus T1 connected to the port P1 having the port number "1", an IP address '192.168.1.1' to the terminal apparatus T1. The IP address delivery apparatus 1 can allocate, in response to a request from the terminal apparatus T2 connected to the port P2 having the port number "2", an IP address '192.168.1.2' to the terminal apparatus T2. The IP address delivery apparatus 1 can allocate, in response to a request from the terminal apparatus T3 connected to the port P3 having the port number "3", an IP address '192.168.1.3' to the terminal apparatus T3. The IP address delivery apparatus 1 can allocate, in response to a request from the terminal apparatus T4 connected to the port P4 having the port number "4", an IP address '192.168.1.4' to the terminal apparatus T4.

This embodiment is applied mainly to a communication network in which a physical pathway is fixed and a communication path is operated in a fixed manner. In other words, for example, it is not a condition of this embodiment to change a network configuration for, for example, during operation, changing a pathway or adding a new switch unit and connecting a terminal apparatus to the switch unit. When such a change is performed, a system is reconstructed before operation. However, as explained later, this embodiment is adaptable to a change for, for example, during maintenance, connecting a normal Ethernet (registered trademark) switch not including the path-information granting unit 16 and connecting a PC (personal computer) for maintenance or the like to the switch. Therefore, in this embodiment, communication is performed in a configuration in which the arrangement of network configuration apparatuses in a network is fixed and a pathway functioning as a communication path is also fixed. Therefore, it is convenient in terms of operation to also fix IP addresses granted to the terminal apparatuses T1 to T4. Specifically, in this embodiment, fixed IP addresses are respectively associated with the paths extending from the terminal apparatuses T1 to T4 to the IP address delivery apparatus 1. A correspondence relation between the paths and the IP addresses is registered in the IP address correspondence table 4b. In this way, in the IP address correspondence table 4b, the IP addresses are associated with the paths (in FIG. 3, port numbers equivalent to the paths). Therefore, for example, when the terminal apparatus T1 connected to the port P1 is replaced with an apparatus of the same type because of a failure or the like, an IP address allocated to the apparatus after the replacement is an IP address same as that before the replacement. Examples of such a communication network include a communication network constructed in, for example, a car of a train. In this case, the IP address delivery apparatus 1 is also mounted on the car. Besides the train, this embodiment is also applicable to a communication system constructed in a mobile body, a communication system constructed in a factory, and the like.

When the IP address delivery apparatus 1 receives an IP address request signal and a port number is absent in a path information storage area of the IP address request signal or a number other than "1" to "4" is stored in the path information storage area, the IP-address determining unit 4c determines that this is information of "others" and, for example, delivers an undelivered IP address among IP addresses '192.168.1.5' to '192.168.1.250' to a transmission source (FIG. 3). Here, the case in which a port number is absent in the path information storage area of the IP address request signal is, for example, when the IP address request signal is received via the normal Ethernet (registered trademark) switch not including the path-information granting unit 16. On the other hand, the case in which the number other than "1" to "4" is stored in the path information storage area of the IP address request signal is, for example, when, if the port P5 not in use is provided in the switch unit 2, a terminal apparatus T5 (not shown) is connected to the port P5 during maintenance and the IP address delivery apparatus 1 receives an IP address request signal from the terminal apparatus T5. All of these cases could occur when a change or an addition is applied to a network configuration in operation and when the network configuration is different from that assumed in operation. However, in this embodiment, it is possible to cope with the cases by preparing an IP address corresponding to "others" in the IP address correspondence table 4b.

Figure 4:
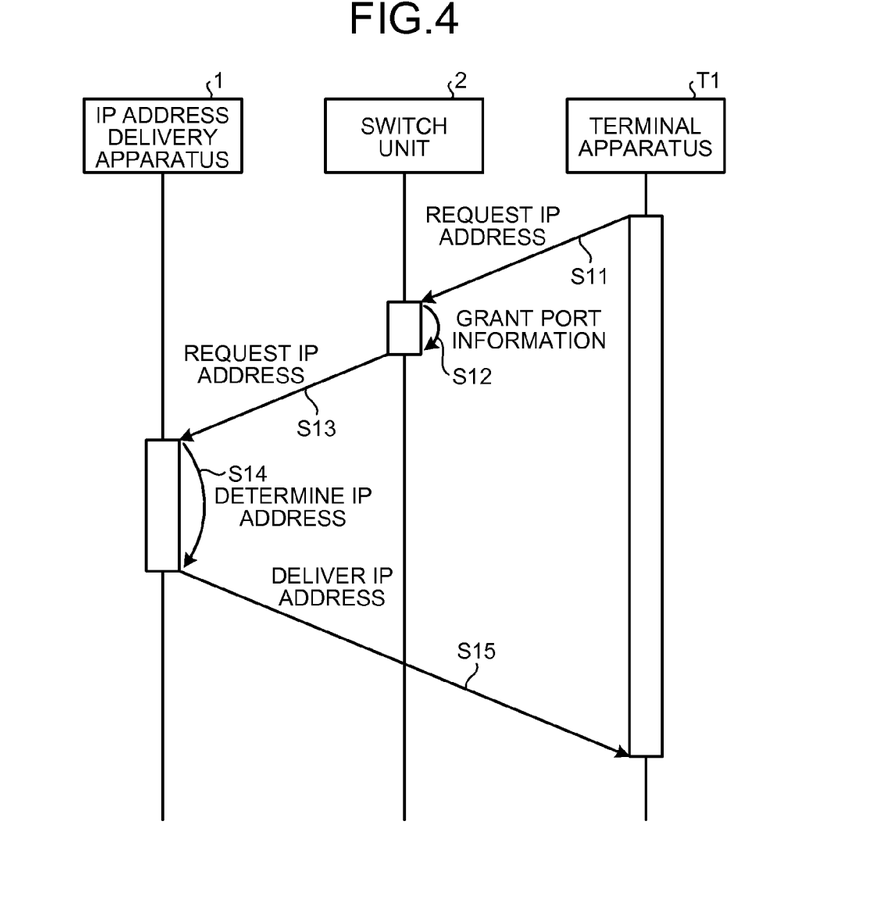
FIG. 4 is a diagram of an operation during IP address delivery by an IP address delivery apparatus in the first embodiment.

FIG. 4 is a diagram of an operation during IP address delivery by the IP address delivery apparatus 1 in this embodiment. Specifically, a procedure for determining and delivering an IP address of the terminal apparatus T1 is shown.

As shown in FIG. 4, the terminal apparatus T1 performs an IP address request (S11). The IP address request is transmitted to the switch unit 2 as an IP address request signal. In the IP address request, the IP address request signal is transmitted in broadcast. A broadcast address is set in a delivery destination address of the IP address request signal. The MAC address of the terminal apparatus T1 is set in a delivery source address.

When the IP address request signal from the terminal apparatus T1 is received by the switch unit 2, the switch unit 2 determines in which of the ports P1 to P4 the IP address request signal is received. The path-information granting unit 16 of the switch unit 2 stores the port number "1" of the port P1 in a path information storage area of the IP address request signal to thereby grant port information serving as path information to the IP address request signal (S12). Subsequently, the switch unit 2 sends the IP address request signal granted with the port information from all the ports P0, P2, P3, and P4 except the port P1. Consequently, the IP address request signal sent from the port P0 is transmitted to the IP address delivery apparatus 1. The IP address request from the terminal apparatus T1 reaches the IP address delivery apparatus 1 through the switch unit 2 (S13).

Subsequently, when the IP address request signal is received by the IP address delivery apparatus 1, the path-information reading unit 4a reads the path information from the IP address request signal. Specifically, the path-information reading unit 4a reads the port number "1" stored in the path information storage area. The IP-address determining unit 4c specifies, by referring to the IP address correspondence table 4b based on the port information obtained from the path-information reading unit 4a, the IP address '192.168.1.1' corresponding to the port number "1". The IP-address determining unit 4c determines the specified IP address as an IP address that should be delivered to the request source (S14).

Subsequently, the IP address delivery apparatus 1 delivers the determined IP address to the terminal apparatus T1 as the request source (S15). In the delivery of the IP address, an IP address delivery message is transmitted in unicast. In a delivery destination address of the IP address delivery message, the MAC address of the terminal apparatus T1 is set. In a delivery source address of the IP address delivery message, a MAC address of the IP address delivery apparatus 1 is set. When the IP address delivery apparatus 1 delivers the IP address, the IP address delivery apparatus 1 stores, in a not-shown storing unit, a path (port) and a MAC address of a terminal apparatus to which the IP address is delivered.

Subsequently, the terminal apparatus T1 that receives the delivery of the IP address from the IP address delivery apparatus 1 sets the delivered IP address as an IP address of its own terminal apparatus T1. Thereafter, the terminal apparatus T1 can perform communication by using the IP address.

After the IP address corresponding to the port number "1" of the port P1 is delivered, when an IP address request signal is received again through the port P1 of the switch unit 2, the IP-address determining unit 4c determines whether a MAC address of a transmission source included in the IP address request signal received again and a MAC address of a transmission source to which an IP address was already delivered are the same.

When the IP-address determining unit 4c determines that the MAC address of the transmission source included in the IP address request signal received again and the MAC address of the transmission source to which the IP address was already delivered are the same, the IP-address determining unit 4c sets the MAC address of the transmission source as a transmission destination address and delivers again an IP address same as the IP address already delivered. For example, after the IP address '192.168.1.1' was delivered in response to an IP address request from the terminal apparatus T1, when an IP address request from the terminal apparatus T1 connected to the port P1 of the switch unit 2 is received again, the IP address '192.168.1.1' is delivered to the terminal apparatus T1 again.

On the other hand, when the IP-address determining unit 4c determines that the MAC address of the transmission source included in the IP address request signal received again and the MAC address of the transmission source to which the IP address was already delivered are different, the IP-address determining unit 4c checks whether the terminal apparatus T1 is connected on the communication network. For example, the IP-address determining unit 4c can transmit a connection check signal to the IP address '192.168.1.1' already delivered and check presence or absence of the connection according to whether a response to the check signal is returned within a predetermined time.

As a result, when a response is not returned within the predetermined time and it is confirmed that the terminal apparatus T1 is not connected on the communication network, the IP-address determining unit 4c sets, as a transmission destination address, the MAC address of the transmission source included in the IP address request signal received again and delivers, to the transmission source, an IP address same as the IP address already delivered. For example, it is assumed that, after the IP address delivery apparatus 1 delivered the IP address '192.168.1.1' in response to an IP address request from the terminal apparatus T1, the terminal apparatus T1 is replaced with the terminal apparatus T5. When the terminal apparatus T5 performs an IP address request, the IP address delivery apparatus 1 delivers, to the terminal apparatus T5, the IP address '192.168.1.1' delivered to the terminal apparatus T1.

Figure 11:
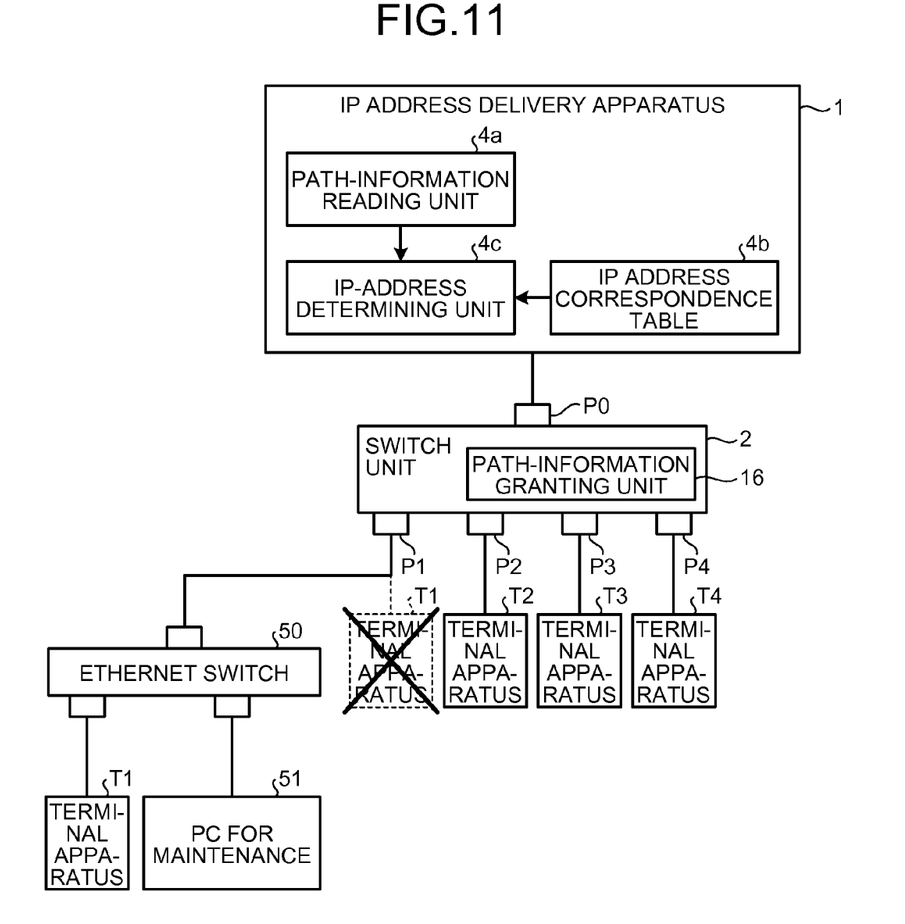
FIG. 11 is a diagram of a configuration example in which a PC for maintenance is connected via an Ethernet (registered trademark) switch.

When a response is returned within the predetermined time and it is confirmed that the terminal apparatus T1 is connected on the communication network, the IP address delivery apparatus 1 selects an unused IP address out of "others" of the IP address correspondence table 4b and delivers the IP address to the transmission source. This could occur when a change not included in design is applied to the communication network and a network communication is different from that shown in FIG. 1. For example, this could occurs when, as shown in FIG. 11, the terminal apparatus T1 connected to the port P1 is once removed and, thereafter, an Ethernet (registered trademark) switch 50 not including the path-information granting unit 16 is connected to the port P1 and the terminal apparatus T1 and a PC (personal computer) for maintenance 51 are further connected to the Ethernet (registered trademark) switch 50.

As explained above, according to this embodiment, after the IP address '192.168.1.1' was allocated to the terminal apparatus T1 connected to, for example, the port P1 of the switch unit 2, when an IP address of the terminal apparatus T1 is set again, it is also possible to allocate the IP address '192.168.1.1' in a fixed manner.

Further, according to this embodiment, after the IP address '192.168.1.1' was allocated to the terminal apparatus T1 connected to, for example, the port P1 of the switch unit 2, when the terminal apparatus T1 is replaced with another terminal apparatus T5, it is also possible to allocate an IP address '192.168.1.1' same as that allocated to the terminal apparatus T1 to the terminal apparatus T5 in a fixed manner.

As explained above, in this embodiment, during replacement of the terminal apparatuses T1 to T4 on the communication network, it is possible to automatically deliver an IP address same as that before the replacement.

This embodiment is suitable when, at least during operation, a communication path (a pathway) of the communication network is fixed and the terminal apparatuses T1 to T4 connected to the communication path are also fixed. However, because IP addresses corresponding to "others" are prepared in the IP address correspondence table 4b, even if a change is applied to a network configuration designed in advance, it is possible to deliver IP addresses that do not overlap one another. Therefore, the operation is not hindered.

The IP address delivery apparatus 1 can be used instead of a DHCP server and the terminals T1 to T4 can be caused to operate using a format same as a format of DHCP clients.

Second Embodiment

Figure 5:
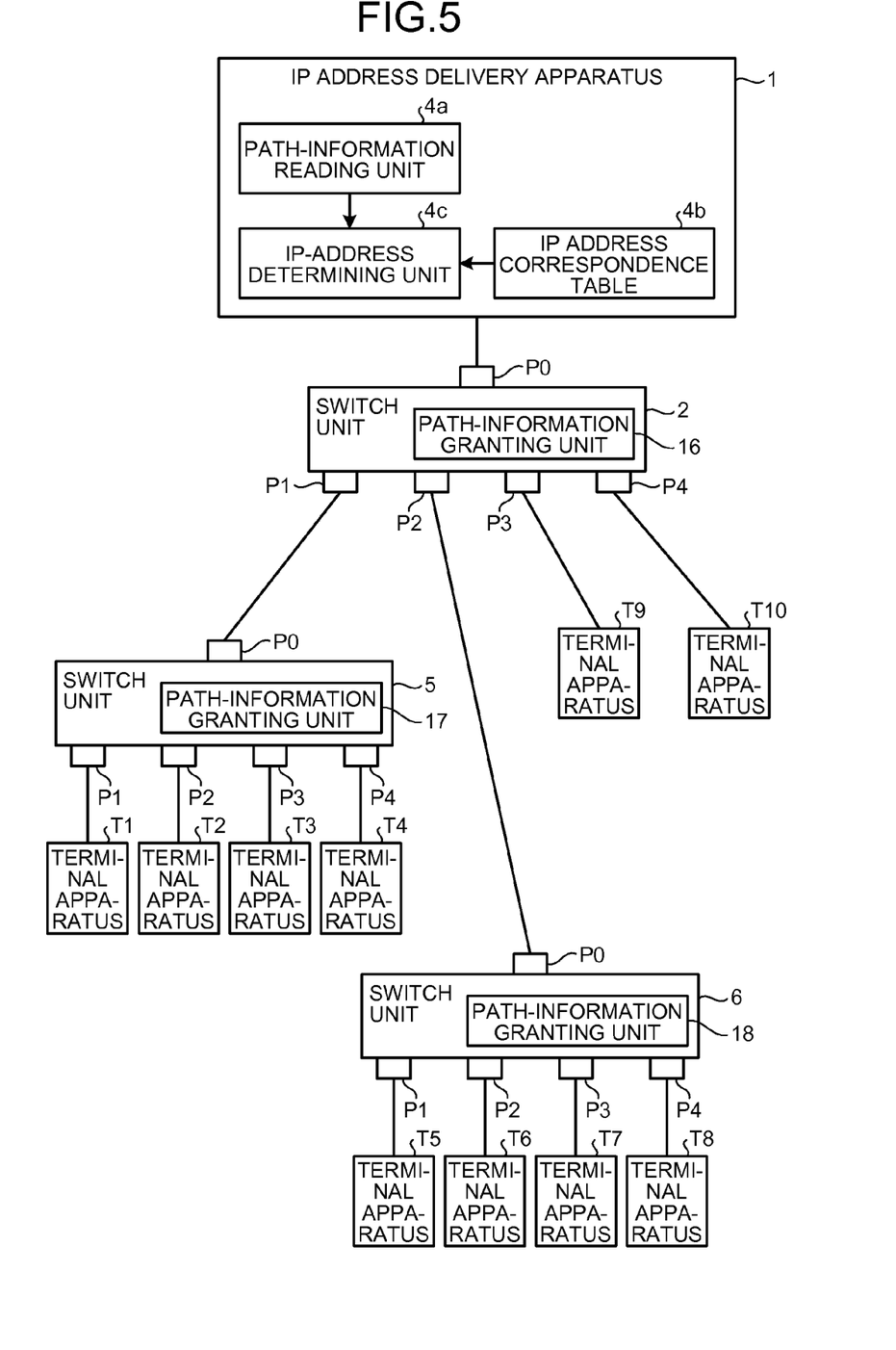
FIG. 5 is a block diagram of a schematic configuration of an IP address delivery system according to a second embodiment.

FIG. 5 is a block diagram of a schematic configuration of an IP address delivery system according to a second embodiment. In FIG. 5, the IP address delivery apparatus 1, switch units 2, 5, and 6, and terminal apparatuses T1 to T10 are provided on a communication network. The IP address delivery apparatus 1 is connected to the terminal apparatuses T1 to T4 sequentially via the switch units 2 and 5, connected to the terminal apparatuses T5 to T8 sequentially via the switch units 2 and 6, and connected to the terminal apparatuses T9 and T10 via the switch unit 2. As the communication network, for example, an Ethernet (registered trademark) can be used.

The IP address delivery apparatus 1 is connected to the port P0 of the switch unit 2. A port P0 of the switch unit 5 is connected to the port P1 of the switch unit 2. A port P0 of the switch unit 6 is connected to the port P2 of the switch unit 2. The terminal apparatuses T9 and T10 are respectively connected to the ports P3 and P4 of the switch unit 2. The terminal apparatuses T1 to T4 are respectively connected to ports P1 to P4 of the switch unit 5. The terminal apparatuses T5 to T8 are respectively connected to ports P1 to P4 of the switch unit 6.

The switch units 2, 5, and 6 can respectively operate as switching hubs on a network. The switch units 2, 5, and 6 can discriminate in which of the ports P0 to P4 signals passing through the switch units are received. Further, the switch unit 2 includes the path-information granting unit 16, the switch unit 5 includes a path-information granting unit 17, and the switch unit 6 includes a path-information granting unit 18. As explained in the first embodiment, the path-information granting units 16, 17, and 18 grant path information to an IP address request signal transmitted from a request source of an IP address. The path information granted by the path-information granting units 16, 17, and 18 is, for example, a port number of a port where the IP address request signal was received.

As in the first embodiment, the IP address delivery apparatus 1 includes the path-information reading unit 4a, the IP address correspondence table 4b, and the IP-address determining unit 4c. The path-information reading unit 4a reads, from the IP address request signal, the path information of the communication network extending to the request source of the IP address. The IP address correspondence table 4b registers a correspondence relation between the path information and the IP address. The IP-address determining unit 4c determines, based on the path information obtained from the path-information reading unit 4a and the IP address correspondence table 4b, an IP address that should be delivered to the request source. In FIG. 5, the request source of the IP address is any one of the terminal apparatuses T1 to T10 that transmitted the IP address request signal.

Figure 6:
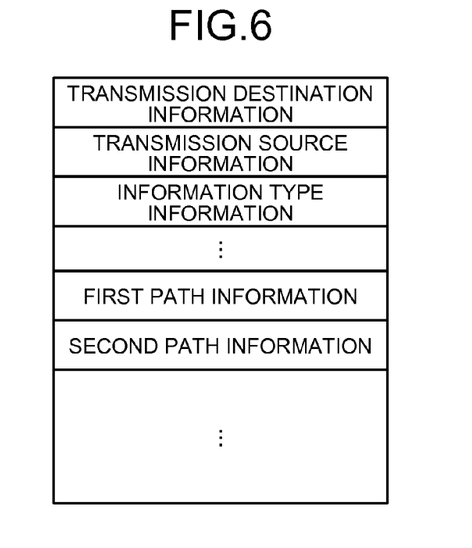
FIG. 6 is a diagram of an example of the structure of an IP address request signal used in IP network communication in the second embodiment.

FIG. 6 is a diagram of an example of the structure of an IP address request signal used in IP network communication in this embodiment. As shown in FIG. 6, the IP address request signal includes areas where transmission destination information, transmission source information, information type information, first path information and second path information, and the like are stored and a reserve area. The transmission source information is information peculiar to the terminal apparatuses T1 to T10 that generated the IP address request signal and is information used for individually specifying the terminal apparatuses T1 to T10. As such information, for example, MAC addresses allocated to the terminal apparatuses T1 to T10 can be used. In the IP address request signal, broadcast is designated as the transmission destination information and information indicating the IP address request signal is used as the information type information.

When the switch units 2, 5, and 6 receive the IP address request signal, the switch units 2, 5, and 6 check the first path information storage area of the IP address request signal. When the first path information storage area is empty, the switch units 2, 5, and 6 store, in the first path information storage area, information (e.g., a port number) of a port where the IP address request signal was received. When information is already stored in the first path information storage area and the second path information storage area is empty, the switch units 2, 5, and 6 store, in the second path information storage area, the information (e.g., the port number) of the port where the IP address request signal was received. After granting the reception port information to the IP address request signal, the switch units 2, 5, and 6 send the IP address request signal from all the ports except the reception port.

Further, for example, when the switch unit 6 receives, in the port P1, an IP address request signal from the terminal apparatus T5, after storing the port number "1" in a first path information storage area of the IP address request signal, the switch unit 6 sends the IP address request signal from the ports P0 and P2 to P4. The switch unit 2 receives the IP address request signal in the port P2. Because information is already stored in the first path information storage area of the IP address request signal, after storing the port number "2" of the reception port in a second path information storage area, the switch unit 2 sends the IP address request signal from the ports P0, P1, P3, and P4. Therefore, the port number "1" is stored in the first path information storage area of the IP address request signal received by the IP address delivery apparatus 1. The port number "2" is stored in the second path information storage area of the IP address request signal.

For example, when the switch unit 2 receives, in the port P3, an IP address request signal from the terminal apparatus T9, after storing the port number "3" in a first path information storage area of the IP address request signal, the switch unit 2 sends the IP address request signal from the ports P0, P1, P2, and P4. Therefore, the port number "3" is stored in the first path information storage area of the IP address request signal received by the IP address delivery apparatus 1. No information is stored in the second path information storage area of the IP address request signal.

Figure 7:
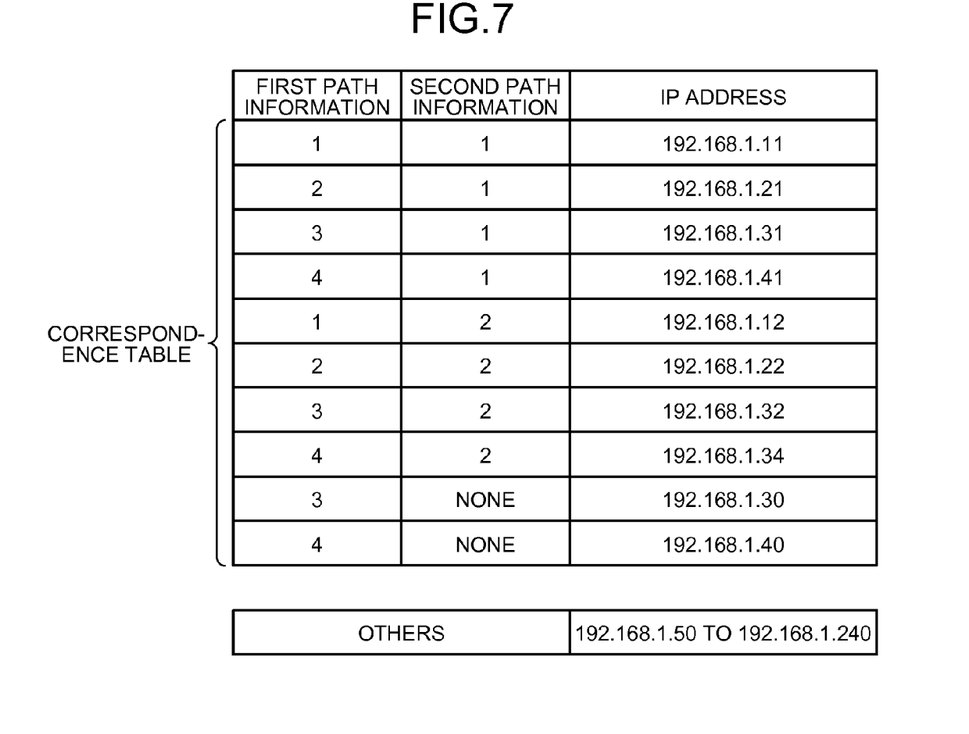
FIG. 7 is a diagram of an example of contents of an IP address correspondence table in the second embodiment.

FIG. 7 is a diagram of an example of contents of the IP address correspondence table 4b in this embodiment. In FIG. 7, a combination of first path information "1" and second path information "1" corresponds to an IP address request signal sent from the terminal apparatus T1 to the IP address delivery apparatus 1 through the port P1 of the switch unit 5 and the port P1 of the switch unit 2. In other words, the first path information "1" and the second path information "1" respectively represent port numbers. In the IP address correspondence table 4b, for example, an IP address '192.168.1.11' is associated with an IP address request signal having the first path information "1" and the second path information "1". The IP address is allocated to the terminal apparatus T1. A combination of first path information "2" and the second path information "1" corresponds to an IP address request signal sent from the terminal apparatus T2 to the IP address delivery apparatus 1 through the port P2 of the switch unit 5 and the port P1 of the switch unit 2. For example, an IP address '192.168.1.21' is allocated to the terminal apparatus T2. A combination of first path information "3" and the second path information "1" corresponds to an IP address request signal sent from the terminal apparatus T3 to the IP address delivery apparatus 1 through the port P3 of the switch unit 5 and the port P1 of the switch unit 2. For example, an IP address '192.168.1.31' is allocated to the terminal apparatus T3. A combination of first path information "4" and the second path information "1" corresponds to an IP address request signal sent from the terminal apparatus T4 to the IP address delivery apparatus 1 through the port P4 of the switch unit 5 and the port P1 of the switch unit 2. For example, an IP address '192.168.1.41' is allocated to the terminal apparatus T4.

A combination of the first path information "1" and second path information "2" corresponds to an IP address request signal sent from the terminal apparatus T5 to the IP address delivery apparatus 1 through the port P1 of the switch unit 6 and the port P2 of the switch unit 2. For example, an IP address '192.168.1.12' is allocated to the terminal apparatus T5. A combination of the first path information "2" and the second path information "2" corresponds to an IP address request signal sent from the terminal apparatus T6 to the IP address delivery apparatus 1 through the port P2 of the switch unit 6 and the port P2 of the switch unit 2. For example, an IP address '192.168.1.22' is allocated to the terminal apparatus T6. A combination of the first path information "3" and the second path information "2" corresponds to an IP address request signal sent from the terminal apparatus T7 to the IP address delivery apparatus 1 through the port P3 of the switch unit 6 and the port P2 of the switch unit 2. For example, an IP address '192.168.1.32' is allocated to the terminal apparatus T7. A combination of the first path information "4" and the second path information "2" corresponds to an IP address request signal sent from the terminal apparatus T8 to the IP address delivery apparatus 1 through the port P4 of the switch unit 6 and the port P2 of the switch unit 2. For example, an IP address '192.168.1.34' is allocated to the terminal apparatus T8.

A combination of the first path information "3" and second path information "none" corresponds to an IP address request signal sent from the terminal apparatus T9 to the IP address delivery apparatus 1 through the port P3 of the switch unit 2. For example, an IP address '192.168.1.30' is allocated to the terminal apparatus T9. A combination of the first path information "4" and the second path information "none" corresponds to an IP address request signal sent from the terminal apparatus T10 to the IP address delivery apparatus 1 through the port P4 of the switch unit 2. For example, an IP address '192.168.1.40' is allocated to the terminal apparatus T10.

As explained above, the IP addresses corresponding to the first path information and the second path information are registered in the IP address correspondence table 4b. When the IP address delivery apparatus 1 receives an IP address request signal, the IP address delivery apparatus 1 reads first path information and second path information of the IP address request signal and determines, by referring to the IP address correspondence table 4b, an IP address delivered to a terminal apparatus that is a request source.

As in the first embodiment, this embodiment is applied mainly to communication by a network in which a pathway is fixed. Therefore, as shown in the IP address correspondence table 4b shown in FIG. 7, the fixed IP addresses are respectively associated with the kinds of path information (i.e., the combinations of the first path information and the second path information) extending from the terminal apparatuses T1 to T10 to the IP address delivery apparatus 1. In this way, in the IP address correspondence table 4b, the IP address is associated with each of the paths. Therefore, for example, when the terminal apparatus T1 connected to the port P1 of the switch unit 5 is replaced with an apparatus of the same type because of a failure or the like, an IP address allocated to an apparatus after the replacement is an IP address same as that before the replacement. Examples of such a communication network include a communication network constructed in, for example, a car of a train. In this case, the IP address delivery apparatus 1 is also mounted on the car. Besides the train, this embodiment is also applicable to a communication system constructed in a mobile body, a communication system constructed in a factory, and the like.

When the IP address delivery apparatus 1 receives an IP address request signal and no information is present either in a first path information storage area or a second path information storage area of the IP address request signal, the IP-address determining unit 4c determines that this is information of "others" and, for example, delivers an undelivered IP address among IP addresses '192.168.1.50' to '192.168.1.240' to a transmission source (FIG. 7).

When the IP address delivery apparatus 1 receives an IP address request signal and a combination of port numbers respectively stored in a first path information storage area and a second path information storage area of the IP address request signal is a combination not registered in the IP address correspondence table 4b, the IP-address determining unit 4c determines that this is information of "others" and, for example, delivers an undelivered IP address among the IP addresses '192.168.1.50' to '192.168.1.240' to a transmission source (FIG. 7).

When the IP address delivery apparatus 1 receives an IP address request signal, a combination of port numbers respectively stored in a first path information storage area and a second path information storage area of the IP address request signal is a combination registered in the IP address correspondence table 4b, and an IP address is already delivered to a terminal apparatus that is a request source of the IP address connected to a communication path specified by the combination of the port numbers, an operation is performed as explained below.

The IP-address determining unit 4c determines whether a MAC address of a transmission source included in the IP address request signal received again and a MAC address of a transmission source to which the IP address was already delivered are the same.

When the IP-address determining unit 4c determines that the MAC address of the transmission source included in the IP address request signal received again and the MAC address of the transmission source to which the IP address was already delivered are the same, the IP-address determining unit 4c sets the MAC address of the transmission source as a transmission destination address and delivers again an IP address same as the IP address already delivered. For example, after the IP address '192.168.1.11' was delivered in response to an IP address request from the terminal apparatus T1, when an IP address request from the terminal apparatus T1 connected to the port P1 of the switch unit 5 is received again, the IP address '192.168.1.11' is delivered to the terminal apparatus T1 again.

On the other hand, when the IP-address determining unit 4c determines that the MAC address of the transmission source included in the IP address request signal received again and the MAC address of the transmission source to which the IP address was already delivered are different, the IP-address determining unit 4c checks whether the terminal apparatus T1 is connected on the communication network. For example, the IP-address determining unit 4c can transmit a connection check signal to the IP address '192.168.1.11' already delivered and check presence or absence of the connection according to whether a response to the check signal is returned within a predetermined time.

As a result, when a response is not returned within the predetermined time and it is confirmed that the terminal apparatus T1 is not connected on the communication network, the IP-address determining unit 4c delivers, to the request source, an IP address same as the IP address already delivered. For example, it is assumed that, after the IP address delivery apparatus 1 delivers the IP address '192.168.1.11' in response to an IP address request from the terminal apparatus T1, the terminal apparatus T1 is replaced with a terminal apparatus T11. When the terminal apparatus T11 performs an IP address request, the IP address delivery apparatus 1 delivers, to the terminal apparatus T11, the IP address '192.168.1.11' delivered to the terminal apparatus T1.

When a response is returned within the predetermined time and it is confirmed that the terminal apparatus T1 is connected on the communication network, the IP address delivery apparatus 1 selects an unused IP address out of "others" of the IP address correspondence table 4b and delivers the IP address to the request source. This occurs when a change not included in design is applied to the communication network. Such an example is explained with reference to FIG. 11 in the first embodiment.

Figure 8:
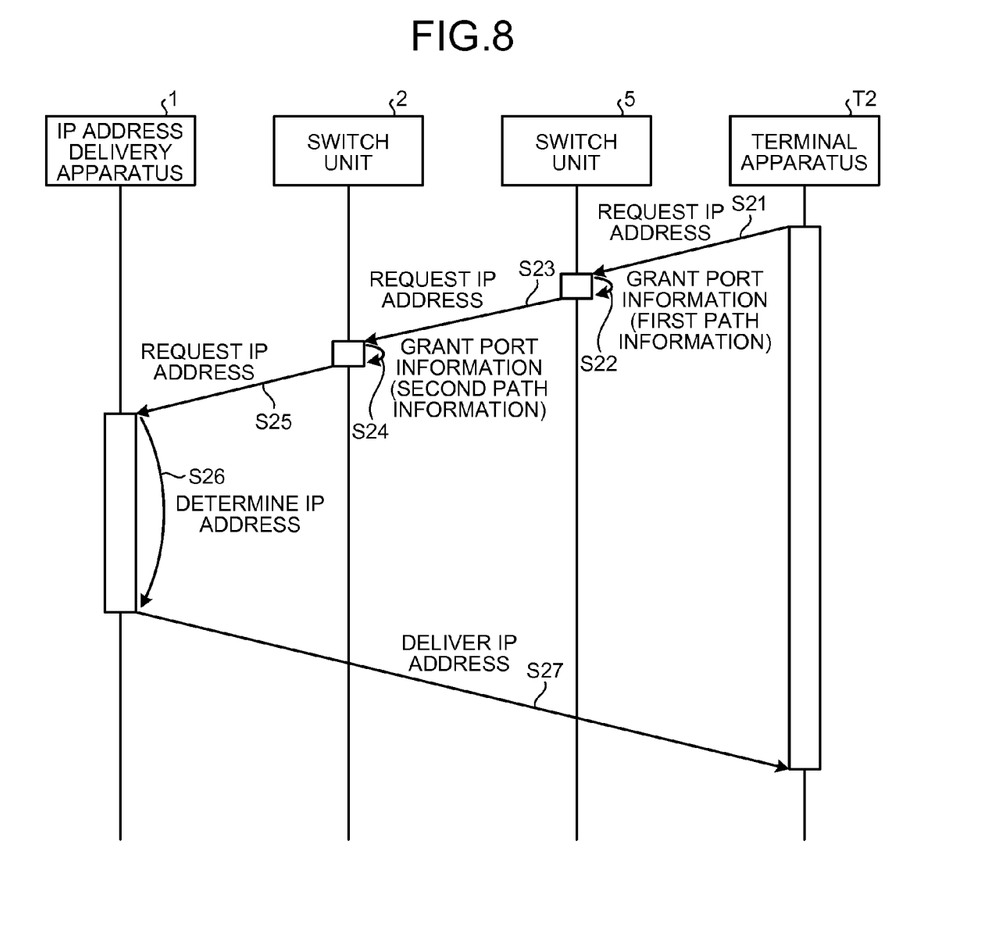
FIG. 8 is a diagram of an operation during IP address delivery by the IP address delivery apparatus in the second embodiment.

FIG. 8 is a diagram of an operation during IP address delivery by the IP address delivery apparatus 1 in this embodiment. Specifically, a procedure for determining and delivering an IP address of the terminal apparatus T2 is shown.

As shown in FIG. 8, first, the terminal apparatus T2 performs an IP address request (S21). The IP address request is transmitted to the switch unit 5 as an IP address request signal. In the IP address request, the IP address request signal is transmitted in broadcast. A broadcast address is set in a delivery destination address of the IP address request signal. The MAC address of the terminal apparatus T2 is set in a delivery source address.

When the IP address request signal from the terminal apparatus T2 is received by the switch unit 5, the switch unit 5 determines in which of the ports P1 to P4 the IP address request signal is received. The path-information granting unit 17 of the switch unit 5 stores the port number "2" of the port P2, which is a reception port, in a first path information storage area of the IP address request signal to thereby grant port information (first path information) to the IP address request signal (S22).

Subsequently, the switch unit 5 sends the IP address request signal granted with the port information from all the ports P0, P1, P3, and P4 except the port P2. Consequently, the IP address request signal sent from the port P0 is transmitted to the switch unit 2 (S23).

When the IP address request signal sent through the switch unit 5 is received by the switch unit 2, the switch unit 2 determines in which of the ports P1 to P4 the IP address request signal was received. The path-information granting unit 16 of the switch unit 2 stores the port number "1" of the port P1, which is the reception port, in a second path information storage area of the IP address request signal to thereby grant port information (second path information) to the IP address request signal (S24).

Subsequently, the switch unit 2 sends the IP address request signal granted with the port information from all the ports P0, P2, P3, and P4 except the port P1. Consequently, the IP address request signal sent from the port P0 is transmitted to the IP address delivery apparatus 1 (S25).

Subsequently, when the IP address request signal is received by the IP address delivery apparatus 1, the path-information reading unit 4a reads the first path information and the second path information from the IP address request signal. Specifically, the path-information reading unit 4a reads the port number "2" stored in the first path information storage area and the port number "1" stored in the second path information storage area. The IP-address determining unit 4c specifies, by referring to the IP address correspondence table 4b based on the port information obtained from the path-information reading unit 4a, the IP address '192.168.1.21' corresponding to a combination of the port number "2" of the first path information and the port number "1" of the second path information. The IP-address determining unit 4c determines the specified IP address as an IP address that should be delivered to the request source (S26).

Subsequently, the IP address delivery apparatus 1 delivers the determined IP address to the terminal apparatus T2 that is the request source (S27). In the delivery of the IP address, an IP address delivery message is transmitted in unicast. In a delivery destination address of the IP address delivery message, the MAC address of the terminal apparatus T2 is set. In a delivery source address of the IP address delivery message, a MAC address of the IP address delivery apparatus 1 is set. When the IP address delivery apparatus 1 delivers the IP address, the IP address delivery apparatus 1 stores, in a not-shown storing unit in the IP address delivery apparatus 1, a path (port) and a MAC address of a terminal apparatus to which the IP address is delivered.

Subsequently, the terminal apparatus T2 that receives the delivery of the IP address from the IP address delivery apparatus 1 sets the delivered IP address as an IP address of the terminal apparatus T2. Thereafter, the terminal apparatus T2 can perform communication by using the IP address.

It goes without saying that this embodiment is also applicable when the network configuration shown in FIG. 5 is generalized. Specifically, in a network configuration in which the number of switch units included on a communication path extending from the IP address delivery apparatus 1 to terminal apparatuses is a maximum of N (N is an integer equal to or larger than 1), it will be enough if first to Nth path information storage areas where first path information to Nth path information are respectively stored are provided in an IP address request signal and also if the IP address correspondence table shown in FIG. 7 is formed to register IP addresses in association with combinations of the first path information to the Nth path information. FIG. 5 corresponds to an IP address delivery system in the case of N=2. Path-information granting units in the switch units store, in a predetermined area among first to Nth path information storage areas of an IP address request signal passing through the switch units, a port number of a port where the IP address request signal is received. For example, the path-information granting units store the port number in an empty area appearing first in order from an area having the smallest number of the first to Nth path information storage areas.

According to this embodiment, as in the first embodiment, during replacement of the terminal apparatuses T1 to T10 on the communication network, it is possible to automatically deliver an IP address same as that before the replacement. The other effects of this embodiment are the same as the effects of the first embodiment.

Third Embodiment

Figure 9:
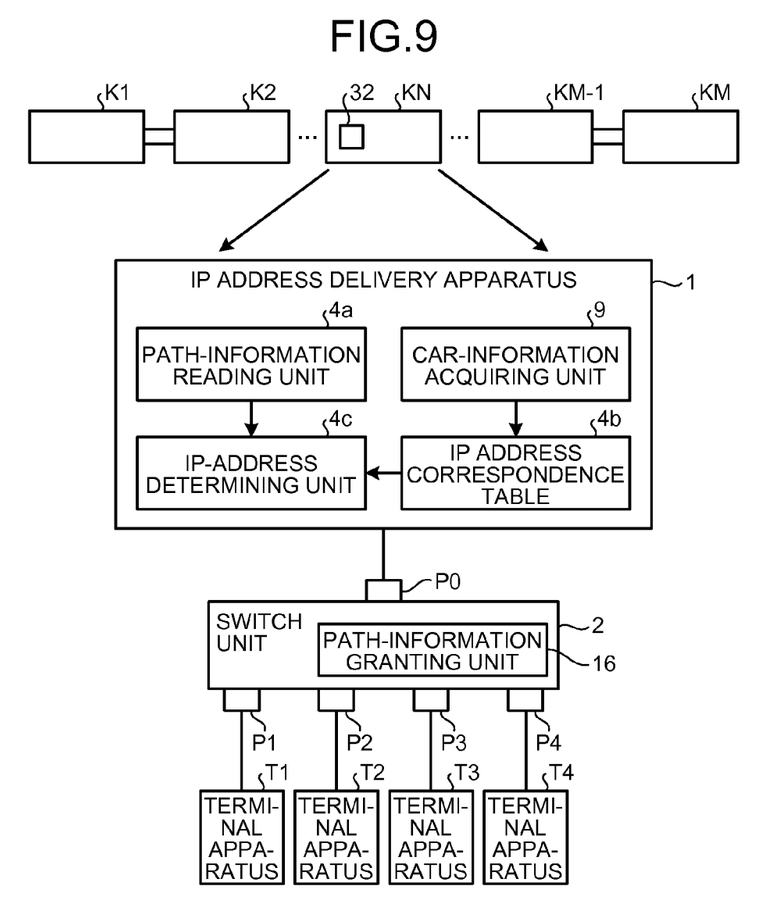
FIG. 9 is a block diagram of a schematic configuration of an IP address delivery system according to a third embodiment.

FIG. 9 is a block diagram of a schematic configuration of an IP address delivery system according to a third embodiment. As shown in FIG. 9, a train includes one or more cars, specifically, cars K1 to KM (M is an integer equal to or larger than 1). The IP address delivery system according to this embodiment is provided in, for example, Nth (N is an integer equal to or larger than 1 and equal to or smaller than M) car in the train formation.

The IP address delivery apparatus 1, the switch unit 2, and the terminal apparatuses T1 to T4 are provided on a communication network constructed in an Nth car KN. The IP address delivery apparatus 1 is connected to the terminal apparatuses T1 to T4 via the switch unit 2. As the communication network, for example, an Ethernet (registered trademark) can be used. As the terminal apparatuses T1 to T4 on the car KN, apparatuses that operate based on a command signal from the outside to operate the car KN, for example, a door opening and closing apparatus, a brake apparatus, an illumination apparatus, or an air conditioning apparatus can be used. The IP address delivery apparatus 1 is connected to the port P0 of the switch unit 2 and the terminal apparatuses T1 to T4 are respectively connected to the ports P1 to P4 of the switch unit 2, whereby a pathway of the communication network is constructed.

In the IP address delivery apparatus 1, the path-information reading unit 4a, the IP address correspondence table 4b, the IP-address determining unit 4c, and a car-information acquiring unit 9 are provided. The path-information reading unit 4a reads, from an IP address request signal, path information of a communication network extending to a request source of an IP address. The car-information acquiring unit 9 can acquire car information for specifying a position in the formation of a car where the communication network is constructed. A car-information managing unit 32 that manages the car information is mounted on each of the cars of the train. The car-information acquiring unit 9 acquires the car information from the car-information managing unit 32. The IP address correspondence table 4b can register a correspondence relation between the path information of the communication network and an IP address determined to correspond to the position in the formation of the car. The IP-address determining unit 4c can determine, based on the path information of the communication network obtained from the path-information reading unit 4a and the car information obtained from the car-information acquiring unit 9, an IP address delivered to the request source of the IP address.

The switch unit 2 can operate as a switching hub on a network and discriminate in which of the ports P0 to P4 a signal passing through the switch unit 2 is received. The switch unit 2 includes the path-information granting unit 16. The path-information granting unit 16 grants path information to the IP address request signal transmitted from the request source of the IP address. For example, when the Ethernet (registered trademark) is used, the switch unit 2 is obtained by adding the path-information granting unit 16 to an Ethernet (registered trademark) switch. The path information granted by the path-information granting unit 16 is, for example, a port number of a port where the IP address request signal is received.

Figure 10:
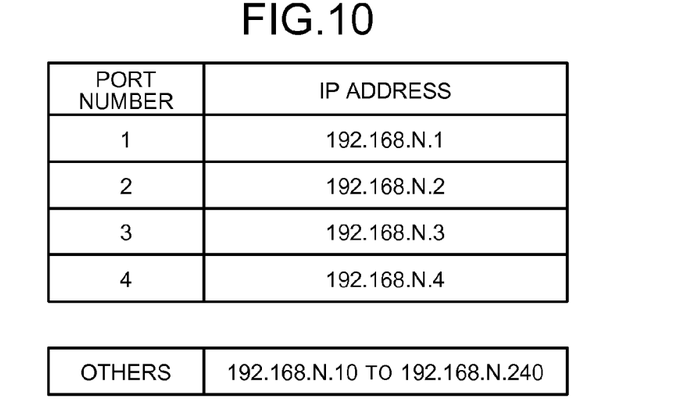
FIG. 10 is a diagram of an example of contents of an IP address correspondence table shown in FIG. 9.

FIG. 10 is a diagram of an example of contents of the IP address correspondence table 4b shown in FIG. 9. FIG. 10 is an example of the IP address correspondence table 4b formed when the IP address delivery apparatus 1 is arranged in the Nth car KN and port numbers of the ports P1 to P4 of the switch unit 2 are respectively 1 to 4. The IP address includes information that is variable depending on car information, specifically, for example, N representing a car number. In this way, in the IP address correspondence table 4b, IP addresses different from one another to respectively correspond to the car number N of the car KN and the port numbers 1 to 4 are registered.

According to the IP address correspondence table 4b shown in FIG. 10, the IP address delivery apparatus 1 can allocate, in response to a request from the terminal apparatus T1 connected to the port P1 having the port number 1, an IP address '192.168.N.1' to the terminal apparatus T1. The IP address delivery apparatus 1 can allocate, in response to a request from the terminal apparatus T2 connected to the port P2 having the port number 2, an IP address '192.168.N.2' to the terminal apparatus T2. The IP address delivery apparatus 1 can allocate, in response to a request from the terminal apparatus T3 connected to the port P3 having the port number 3, an IP address '192.168.N.3' to the terminal apparatus T3. The IP address delivery apparatus 1 can allocate, in response to a request from the terminal apparatus T4 connected to the port P4 having the port number 4, an IP address '192.168.N.4' to the terminal apparatus T4.

An operation in this embodiment is explained. For example, the terminal apparatus T1 performs an IP address request. First, when car information is sent from the car-information managing unit 32 to the car-information acquiring unit 9, an IP address corresponding to the car information is set in the IP address correspondence table 4b for each of the port numbers 1 to 4. For example, when it is assumed that an IP address is delivered from the IP address delivery apparatus 1 to the communication network of the car KN, an IP address corresponding to the car number N of the car KN is registered in an IP address correspondence table 4b for each of the port numbers 1 to 4.

Subsequently, the terminal apparatus T1 transmits an IP address request signal in broadcast. When the IP address request signal from the terminal apparatus T1 is received by the switch unit 2, the switch unit 2 determines that the IP address request signal is received via the port P1. The path-information granting unit 16 of the switch unit 2 stores the port number "1" of the port P1 in a path information storage area of the IP address request signal. The switch unit 2 sends the IP address request signal granted with the port information from all the ports P0, P2, P3, and P4 except the port P1.

Subsequently, when the IP address request signal is received by the IP address delivery apparatus 1, the path-information reading unit 4a reads path information from the IP address request signal. Specifically, the path-information reading unit 4a reads the port number "1" stored in the path information storage area. The IP-address determining unit 4c specifies, by referring to the IP address correspondence table 4b based on the port information obtained from the path-information reading unit 4a, the IP address '192.168.N.1' corresponding to the port number "1" and determines the specified IP address as an IP address that should be delivered to the request source.

Subsequently, the IP address delivery apparatus 1 delivers the determined IP address to the terminal apparatus T1 at the request source. In the delivery of the IP address, an IP address delivery message is transmitted in unicast. In a delivery destination address of the IP address delivery message, the MAC address of the terminal apparatus T1 is set. In a delivery source address of the IP address delivery message, a MAC address of the IP address delivery apparatus 1 is set. When the IP address delivery apparatus 1 delivers the IP address, the IP address delivery apparatus 1 stores, in a not-shown storing unit in the IP address delivery apparatus 1, a port and a MAC address of a terminal apparatus to which the IP address should be delivered.

Subsequently, the terminal apparatus T1 that receives the delivery of the IP address from the IP address delivery apparatus 1 sets the delivered IP address as an IP address of the terminal apparatus T1. Thereafter, the terminal apparatus T1 can perform communication by using the IP address.

When the switch units are connected, for example, in a cascade shape as shown in FIG. 5, delivery of an IP address can be performed as in the second embodiment.

According to this embodiment, it is possible to grant fixed IP addresses to the terminal apparatuses T1 to T4 set in the car of the train according to a position in the formation of the car. The other effects of this embodiment are the same as the effects of the first and second embodiments.

INDUSTRIAL APPLICABILITY

As explained above, the present invention is useful as an IP address delivery apparatus and an IP address delivery method for automatically delivering a fixed IP address during setting of a terminal apparatus on a network.

REFERENCE SIGNS LIST

1 IP ADDRESS DELIVERY APPARATUS
2, 5, 6 SWITCH UNITS
4a PATH-INFORMATION READING UNIT
4b IP ADDRESS CORRESPONDENCE TABLE
4c IP-ADDRESS DETERMINING UNIT
16, 17, 18 PATH-INFORMATION GRANTING UNITS
9 CAR-INFORMATION ACQUIRING UNIT
32 CAR-INFORMATION MANAGING UNIT
50 ETHERNET (REGISTERED TRADEMARK) SWITCH
51 PC (PERSONAL COMPUTER) FOR MAINTENANCE
P0 to P4 PORTS
T1 to T10 TERMINAL APPARATUSES

The invention claimed is:

1. An IP address delivery system comprising:
an IP address delivery apparatus including:
a path-information reading unit configured to read, from an IP address request signal transmitted from a request source of an IP address, path information of a communication network extending to the request source;
an IP address correspondence table in which a correspondence relation between the path information and the IP address is registered; and
an IP-address determining unit configured to determine, based on the path information obtained from the path-information reading unit and the IP address correspondence table, an IP address delivered to the request source; and
a path-information granting unit provided on a communication path between the IP address delivery apparatus and the request source and configured to grant the path information to the IP address request signal transmitted from the request source.

2. The IP address delivery system according to claim 1, wherein the communication network is operated with a communication path fixed therein.

3. The IP address delivery system according to claim 1, wherein
the communication network includes a switch unit configured to include a plurality of ports and function as at least a switching hub, the switch unit includes the path-information granting unit configured to store, as the path information, in a path information storage area of the IP address request signal, a port number of a port where the IP address request signal is received, and in the IP address correspondence table, a correspondence relation between the port number of the switch unit and the IP address is registered.

4. The IP address delivery system according to claim 3, wherein, when the path information is not stored in the path information storage area of the IP address request signal or when a port number different from the port number registered in the IP address correspondence table is stored in the path information storage area, the IP-address determining unit delivers, to the request source of the IP address, an undelivered IP address different from the IP address corresponding to the port number registered in the IP address correspondence table.

5. The IP address delivery system according to claim 3, wherein, when the path information granted to the IP address request signal received by the IP address delivery apparatus is the same as path information of a path extending to a request source to which an IP address was already delivered and a MAC address of a transmission source included in the received IP address request signal is different from a MAC address of a transmission source included in an IP address request signal from the request source to which the IP address was already delivered, the IP-address determining unit transmits a connection check signal to the IP address already delivered, when a response to the check signal is returned within a predetermined time, delivers, to the request source of the IP address, an undelivered IP address different from the IP address corresponding to the port number registered in the IP address correspondence table, and, when a response to the check signal is not returned within the predetermined time, delivers, to the request source of the IP address, the IP address already delivered.

6. The IP address delivery system according to claim 3, wherein, when a number of switch units included on a communication path extending from the IP address delivery apparatus to the request source of the IP address is a maximum of N (N is an integer equal to or larger than 2), the path information storage area of the IP address request signal includes first to Nth path information storage areas in which first path information to Nth path information are respectively stored, the IP address correspondence table registers IP addresses in association with combinations of the first path information to the Nth path information, and when the IP address request signal passes through the switch unit, the path-information granting unit of the switch unit stores, in a predetermined area among the first path information storage area to the Nth path information storage area, the port number of the port where the IP address request signal was received.

7. The IP address delivery system according to claim 1, wherein the IP address delivery apparatus is mounted in a car of a train, and the communication network is constructed in the car.

8. The IP address delivery system according to claim 7, wherein the IP address delivery apparatus includes a car-information acquiring unit configured to acquire car information for specifying a position in formation of the car in which the communication network is constructed, in the IP address correspondence table, a correspondence relation between the path information and an IP address determined to correspond to the position in the formation of the car is registered, and the IP-address determining unit determines, based on the path information obtained from the path-information reading unit and the IP address correspondence table, the IP address delivered to the request source.

9. An IP address delivery method comprising:

granting, by a path-information granting unit provided on a communication path between an IP address delivery apparatus and a request source of an IP address, to an IP address request signal transmitted from the request source, path information of a communication network extending to the request source;

reading, by the IP address delivery apparatus, the path information from the IP address request signal transmitted from the request source;

referring, by the IP address delivery apparatus, to an IP address correspondence table in which a correspondence relation between the path information and the IP address is registered to determine an IP address corresponding to the read path information; and delivering, by the IP address delivery apparatus, the determined IP address to the request source.

10. The IP address delivery method according to claim 9, wherein, in the communication network, a communication path is fixed at least during operation of the communication network and the request source of the IP address connected to the communication path is also fixed.

11. The IP address delivery method according to claim 9, wherein the communication network includes a switch unit configured to include a plurality of ports and function as at least a switching hub, the switch unit stores, as the path information, in a path information storage area of the IP address request signal, a port number of a port where the IP address request signal is received, and in the IP address correspondence table, a correspondence relation between the port number of the switch unit and the IP address is registered.

* * * * *